US008630174B1

(12) United States Patent
Amdahl et al.

(10) Patent No.: US 8,630,174 B1
(45) Date of Patent: Jan. 14, 2014

(54) SYSTEM AND METHOD FOR POST SHAPING TCP PACKETIZATION

(75) Inventors: Saxon Amdahl, Mountain View, CA (US); Jonathan Hawthorne, Eugene, OR (US)

(73) Assignee: F5 Networks, Inc., Seattle, WA (US)

( * ) Notice: Subject to any disclaimer, the term of this patent is extended or adjusted under 35 U.S.C. 154(b) by 148 days.

(21) Appl. No.: 13/232,862

(22) Filed: Sep. 14, 2011

Related U.S. Application Data (60) Provisional application No. 61/382,827, filed on Sep. 14, 2010.

(51) Int. Cl.
    *H04L 1/00* (2006.01)
(52) U.S. Cl.
    USPC ...................................................... 370/230.1
(58) Field of Classification Search
    USPC .................... 370/229–235, 254, 351–357, 370/395.5–395.52, 412–413, 419–420, 463
    See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |
| 4,897,781 A | 1/1990 | Chang et al. |
| 4,965,772 A | 10/1990 | Daniel et al. |
| 5,023,826 A | 6/1991 | Patel |
| 5,053,953 A | 10/1991 | Patel |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |

(Continued)

FOREIGN PATENT DOCUMENTS

| | | |
|---|---|---|
| EP | 0744850 A2 | 11/1996 |
| WO | WO 91/14326 | 9/1991 |

(Continued)

OTHER PUBLICATIONS

Configuration Guide for Local Traffic Management version 9.2.2, F5 Networks, Inc., 406 pages, Jan. 2006.*

(Continued)

*Primary Examiner* — Frank Duong
(74) *Attorney, Agent, or Firm* — LeClairRyan, A Professional Corporation (57) ABSTRACT

A system, non-transitory machine readable medium and method of delayed packetization of data packets is disclosed. The system and method includes requesting authorization from a QoS queue to transmit an intended data packet over a network, wherein the authorization request is sent from an application module of a transmitting network device. The system and method includes receiving from the QoS queue a transmission order to transmit the intended data packet at a future time. The system and method includes packetizing the intended data packet in accordance with the transmission order at the future time. The system and method includes transmitting the packetized data packet over a network to a receiving network device.

21 Claims, 3 Drawing Sheets

(56) References Cited

U.S. PATENT DOCUMENTS

| | | | |
|---|---|---|---|
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 * | 4/2002 | Masters | 709/229 |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,708,187 B1 | 3/2004 | Shanumgam et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,816,901 B1 | 11/2004 | Sitaraman et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,113,993 B1 | 9/2006 | Cappiello et al. |
| 7,139,792 B1 | 11/2006 | Mishra et al. |
| 7,228,422 B2 * | 6/2007 | Morioka et al. | 713/171 |
| 7,287,082 B1 | 10/2007 | O'Toole, Jr. |
| 7,308,703 B2 | 12/2007 | Wright et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,454,480 B2 | 11/2008 | Labio et al. |
| 7,490,162 B1 | 2/2009 | Masters |
| 7,500,269 B2 | 3/2009 | Huotari et al. |
| 7,526,541 B2 | 4/2009 | Roese et al. |
| 7,558,197 B1 | 7/2009 | Sindhu et al. |
| 7,624,424 B2 | 11/2009 | Morita et al. |
| 7,801,978 B1 | 9/2010 | Susai et al. |
| 8,130,650 B2 | 3/2012 | Allen, Jr. et al. |
| 2001/0023442 A1 | 9/2001 | Masters |
| 2002/0059428 A1 | 5/2002 | Susai et al. |
| 2002/0161913 A1 | 10/2002 | Gonzalez et al. |
| 2002/0198993 A1 | 12/2002 | Cudd et al. |
| 2003/0046291 A1 | 3/2003 | Fascenda |
| 2003/0086415 A1 | 5/2003 | Bernhard et al. |
| 2003/0108052 A1 | 6/2003 | Inoue et al. |
| 2003/0145062 A1 | 7/2003 | Sharma et al. |
| 2003/0225485 A1 | 12/2003 | Fritz et al. |
| 2004/0267920 A1 | 12/2004 | Hydrie et al. |
| 2004/0268358 A1 | 12/2004 | Darling et al. |
| 2005/0004887 A1 | 1/2005 | Igakura et al. |
| 2005/0052440 A1 | 3/2005 | Kim et al. |
| 2005/0055435 A1 | 3/2005 | Gbadegesin et al. |
| 2005/0122977 A1 | 6/2005 | Lieberman |
| 2005/0154837 A1 | 7/2005 | Keohane et al. |
| 2005/0187866 A1 | 8/2005 | Lee |
| 2006/0059267 A1 | 3/2006 | Cugi et al. |
| 2006/0156416 A1 | 7/2006 | Huotari et al. |
| 2006/0161577 A1 | 7/2006 | Kulkarni et al. |
| 2006/0171365 A1 | 8/2006 | Borella |
| 2006/0233106 A1 | 10/2006 | Achlioptas et al. |
| 2006/0242300 A1 | 10/2006 | Yumoto et al. |
| 2007/0016662 A1 | 1/2007 | Desai et al. |
| 2007/0064661 A1 | 3/2007 | Sood et al. |
| 2007/0083646 A1 | 4/2007 | Miller et al. |
| 2007/0107048 A1 | 5/2007 | Halls et al. |
| 2007/0118879 A1 | 5/2007 | Yeun |
| 2007/0174491 A1 | 7/2007 | Still et al. |
| 2007/0297551 A1 | 12/2007 | Choi |
| 2008/0034136 A1 | 2/2008 | Ulenas |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0201599 A1 | 8/2008 | Ferraiolo et al. |
| 2008/0256224 A1 | 10/2008 | Kaji et al. |
| 2008/0301760 A1 | 12/2008 | Lim |
| 2009/0049230 A1 | 2/2009 | Pandya |
| 2009/0125625 A1 | 5/2009 | Shim et al. |
| 2009/0138749 A1 | 5/2009 | Moll et al. |
| 2009/0141891 A1 | 6/2009 | Boyen et al. |
| 2009/0228956 A1 | 9/2009 | He et al. |
| 2009/0287935 A1 | 11/2009 | Aull et al. |
| 2010/0023582 A1 | 1/2010 | Pedersen et al. |
| 2010/0122091 A1 | 5/2010 | Huang et al. |
| 2010/0150154 A1 | 6/2010 | Viger et al. |
| 2010/0251330 A1 | 9/2010 | Kroeselberg et al. |

(56) References Cited

U.S. PATENT DOCUMENTS

| | | | |
|---|---|---|---|
| 2010/0325277 | A1 | 12/2010 | Muthiah et al. |
| 2011/0047620 | A1 | 2/2011 | Mahaffey et al. |
| 2011/0066718 | A1 | 3/2011 | Susai et al. |
| 2011/0173295 | A1* | 7/2011 | Bakke et al. .................. 709/217 |
| 2011/0321122 | A1 | 12/2011 | Mwangi et al. |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

Williams et al., "The Ultimate Windows Server 2003 System Administrator's Guide: Forwarding Authentication," 2003, 2 pages, Figure 10.7, Addison-Wesley Professional, Boston, Massachusetts.

"Windows Server 2003 Kerberos Extensions," Microsoft TechNet, 2003, 8 pages, (Updated Jul. 31, 2004), http://technet.microsoft.com/en-us/library/cc738207, Microsoft Corporation.

Macvittie, Lori, "Message-Based Load Balancing," Technical Brief, Jan. 2010, pp. 1-9, F5 Networks, Inc.

Crescendo Networks, "Application Layer Processing (ALP)," 2003-2009, pp. 168-186, Chapter 9, CN-5000E/5500E, Foxit Software Company.

"A Process for Selective Routing of Servlet Content to Transcoding Modules," Research Disclosure 422124, Jun. 1999, pp. 889-890, IBM Corporation.

"BIG-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page, Las Vegas, Nevada.

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

F5 Networks Inc., "Configuration Guide for Local Traffic Management," F5 Networks Inc., Jan. 2006, version 9.2.2, 406 pgs.

* cited by examiner

SYSTEM AND METHOD FOR POST SHAPING TCP PACKETIZATION

STATEMENT OF RELATED APPLICATION

The present application claims the benefit of priority based on U.S. Provisional Patent Application Ser. No. 61/382,827, filed on Sep. 14, 2010, in the name of inventors Saxon Amdahl and Jonathan Hawthorne, entitled "Post Shaping TCP Packetization", all commonly owned herewith.

TECHNOLOGICAL FIELD

This technology generally relates to improving network efficiency and in particular, to a system and method for post shaping TCP packetization.

BACKGROUND

Transmission Control Protocol (TCP) provides a communication service between application programs of a transmitting network device and a receiving network device using the Internet Protocol (IP). In particular, when a transmitting network device transmits a chunk of data across a wide area network (e.g. Internet), application layer software on the transmitter network device issues a request using the TCP layer. The TCP layer handles routing and SEND/ACK details to ensure delivery of the data to the receiving network device.

Due to network congestion, traffic load balancing or other unpredictable network behavior can cause data packets to be lost, duplicated, or delivered out of order between the transmitting and receiving network devices. The TCP layer detects these problems, requests retransmission of lost packets, rearranges out-of-order packets, and/or minimizes network congestion to reduce the occurrence of the other delivery problems. Once the receiving network device has reassembled data packets sent from the transmitting network device, it passes the data packets to the application program running on the network device.

When data packets are transmitted between the transmitting and receiving network devices, rate or traffic shaping is used by a rate shaper of the transmitting network device to control the rate of flow at which data is transmitted. Typically, the receiving network device continually informs the transmitting network device as to how much data it can receive. When the receiving network device's buffer fills up with data, the next acknowledgment which it sends to the transmitting network device notifies it to suspend or stop sending more data until the receiving network device is able to process the already received data packets and therefore catch up.

Network performance is maintained by using Quality of Service (QoS) procedures and implementations performed by the rate shaper, such as a QoS queue. Typically, the transmitting device packetizes data packets in accordance with TCP and sends those packetized or written data packets to the QoS queue. The QoS queue stores the packetized packets and buffers them before transmitting them to control the traffic flow based on predetermined handling parameters. However, this process results in Round Trip Time (RTT) variance as well as latency jitter as the transmitting device is unable to control when to transmit of the data packet after it has been written and sent to the QoS queue.

What is needed is a system and method which delays packetization of data packets to occur immediately before the data packets are to be transmitted.

SUMMARY

A system, non-transitory machine readable medium and/or method of delayed packetization of data packets is disclosed. The system and method includes requesting authorization from a QoS queue to transmit an intended data packet over a network, wherein the authorization request is sent from an application module of a transmitting network device. The system and method includes receiving from the QoS queue a transmission order to transmit the intended data packet at a future time. The system and method includes packetizing the intended data packet in accordance with the transmission order at the future time. The system and method includes transmitting the packetized data packet over a network to a receiving network device.

While these examples are susceptible of embodiments in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

In general, the system, non-transitory machine readable medium and method of the present disclosure utilizes the application module which operates with a QoS queue, whereby the application module is configured to await permission from the QoS queue before packetizing the data packet(s) before transmission. The present disclosure is a significant departure from the existing method of writing or packetizing the data packets and then forwarding the written data packets to the QoS queue for buffering. In particular, the system and method of the present disclosure is configured to allow the QoS queue to account for non-transmitted and unpacketized data stream and provide a place holder for the accounted-for data stream in which the place holder represents the order in which the data stream is to be transmitted.

Figure 1:
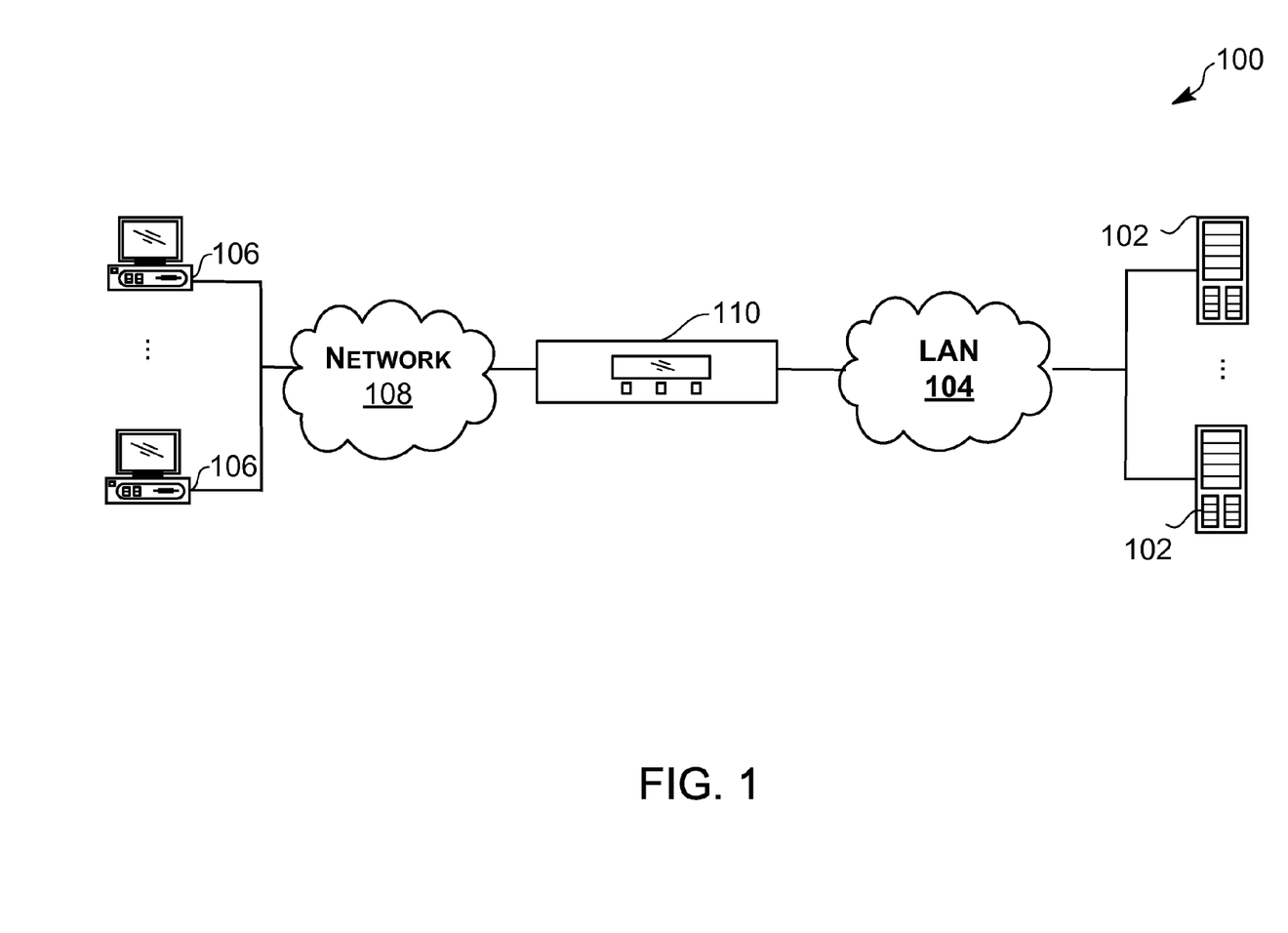
FIG. 1 is a diagram of an example system environment that improves network performance in accordance with an aspect of the present disclosure.

FIG. 1 illustrates an example system environment 100 includes one or more network devices, such as one or more servers 102, one or more network traffic management devices 110 and one or more client devices 106. In an aspect, the one or more servers 102 operate in a secured network domain, whereby one or more client devices 106 can access the one or more servers 102 over a wide area network (WAN) 108. The VPN tunnel is implemented using VPN software which is operated in the client devices 106, the servers 102 as well as the network traffic management device 110. In particular, VPN software allows data to be transmitted and received among endpoint devices via an established VPN tunnel.

The network traffic management device 110 is coupled to the servers 102 via local area network (LAN) 104 and client devices 106 via network 108. In aspect, requests in the form of data packets are sent from one or more client devices 106 to one or more servers 102. In particular, one or more network traffic management devices 110, which sit between the client device 106 and the server 102, receives and processes the requests, in the form of data packets, that are sent from a transmitting network device (e.g. requesting client device 102) and sends them to a receiving network device (e.g. server 102). Similarly, responses in the form of data packets that are transmitted from a transmitting network device (e.g. responding server 102 are received and processed by the network traffic management device 110, whereby the network traffic management device 110 sends the responses to the receiving network device (e.g. requesting client device 106).

Client devices 106 comprise computing devices capable of connecting to other computing network devices, such as network traffic management device 110 and/or the servers 102. Such connections are performed over wired and/or wireless networks, such as network 108, to send and receive data, such as for Web-based and non Web-based requests, receiving responses to requests and/or performing other tasks, in accordance with the processes described below in connection with the present disclosure. Non-limiting and non-exhausting examples of such client devices include personal computers (e.g., desktops, laptops, tablets), mobile and/or smart phones, video and video game consoles, smart televisions, vehicles incorporating computers and the like.

In an example, client devices 106 can run Web browsers that may provide an interface for operators, such as human users, to interact with or to make requests for resources to different web server-based applications or Web pages via the network 108, although other server resources may be requested by clients. One or more Web-based applications may run on a web application enabled server 102 that provide the requested data back to one or more network devices, such as client devices 106. One or more of the client devices also include client side software which allows the client device 106 to connect to the secure network via the network traffic management device 110.

Network 108 comprises a publicly accessible network, such as the Internet. However, it is contemplated that the network 108 may comprise other types of private and public networks that include other devices. Communications, such as requests from client devices 106 and responses from servers 102, take place over the network 108 which utilizes a network protocol, such as the HTTP and TCP/IP protocols, for example. However, the principles discussed herein are not limited to this example and can include other protocols. Further, it should be appreciated that network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs and other networks to enable messages and other data to be sent from and to network devices.

Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 108 includes any communication method by which data may travel between client devices 106, servers 102 and network traffic management device 110, and the like.

LAN 104 comprises a private local area network that includes the network traffic management device 110 coupled to the one or more servers 102, although the LAN 104 may comprise other types of private and public networks with other devices. Networks, including local area networks, besides being understood by those skilled in the relevant arts, have already been generally described above in connection with network 108 and thus will not be described further.

The one or more servers 102 comprise one or more server computing machines capable of operating one or more Web-based and/or non Web-based applications that may be accessed by other network devices. Such applications may provide data representing requested resources, such as particular Web page(s), image(s) of physical objects, and any other objects, responsive to the requests. It should be noted that the server 102 may perform other tasks and provide other types of resources. It is to be understood that the one or more servers 102 may comprise hardware and/or software, and/or may represent a system with multiple servers that may include internal or external networks. In this example, the servers 102 may be Web application servers such as Microsoft® IIS servers or Apache® servers, although other types of servers may be used. Further, additional servers may be coupled to the network 108 and many different types of applications may be available on servers coupled to the network 108.

It should be noted that while only two servers 102 are shown in the environment 100 depicted in FIG. 1, other numbers and types of servers may be coupled to the network traffic management device 110. It is also contemplated that one or more of the servers 102 may be a cluster of servers managed by the network traffic management device 110. Each of the servers 102 and client devices 106 may include one or more central processing units (CPUs), one or more computer readable media (i.e., memory), and interface systems that are coupled together by internal buses or other links as are generally known to those of ordinary skill in the art.

As per the TCP/IP protocols, requests from the requesting client devices 106 may be sent as one or more streams of data packets over network 108 to the network traffic management device 110 and/or the servers 102. Such protocols can establish connections, send and receive data for existing connections, and the like.

As shown in the example environment 100 depicted in FIG. 1, the network traffic management device 110 is interposed between client devices 106 and the servers 102. Again, the environment 100 could be arranged in other manners with other numbers and types of devices. Also, the network traffic management device 110 is coupled to network 108 by one or more network communication links and intermediate network devices (e.g. routers, switches, gateways, hubs and the like) (not shown). In an aspect, the environment 100 does not utilize the network traffic management device 110. It should be understood that the devices and the particular configuration shown in FIG. 1 are provided for exemplary purposes only and thus are not limiting.

Generally, the network traffic management device 110 manages network communications, which may include one or more client requests and server responses, via the network 108 between one or more client devices 106 and one or more of the servers 102. These requests may be destined for one or more servers 102, and may take the form of one or more TCP/IP data packets. In an aspect, the requests pass through one or more intermediate network devices and/or intermediate networks, until they ultimately reach the network traffic management device 110. In any case, the network traffic management device 110 may manage the network communications by performing several network traffic related functions involving the communications. Additionally, the network traffic management device 110 may perform such functions including, but not limited to, load balancing, access control, and the like.

Figure 2:
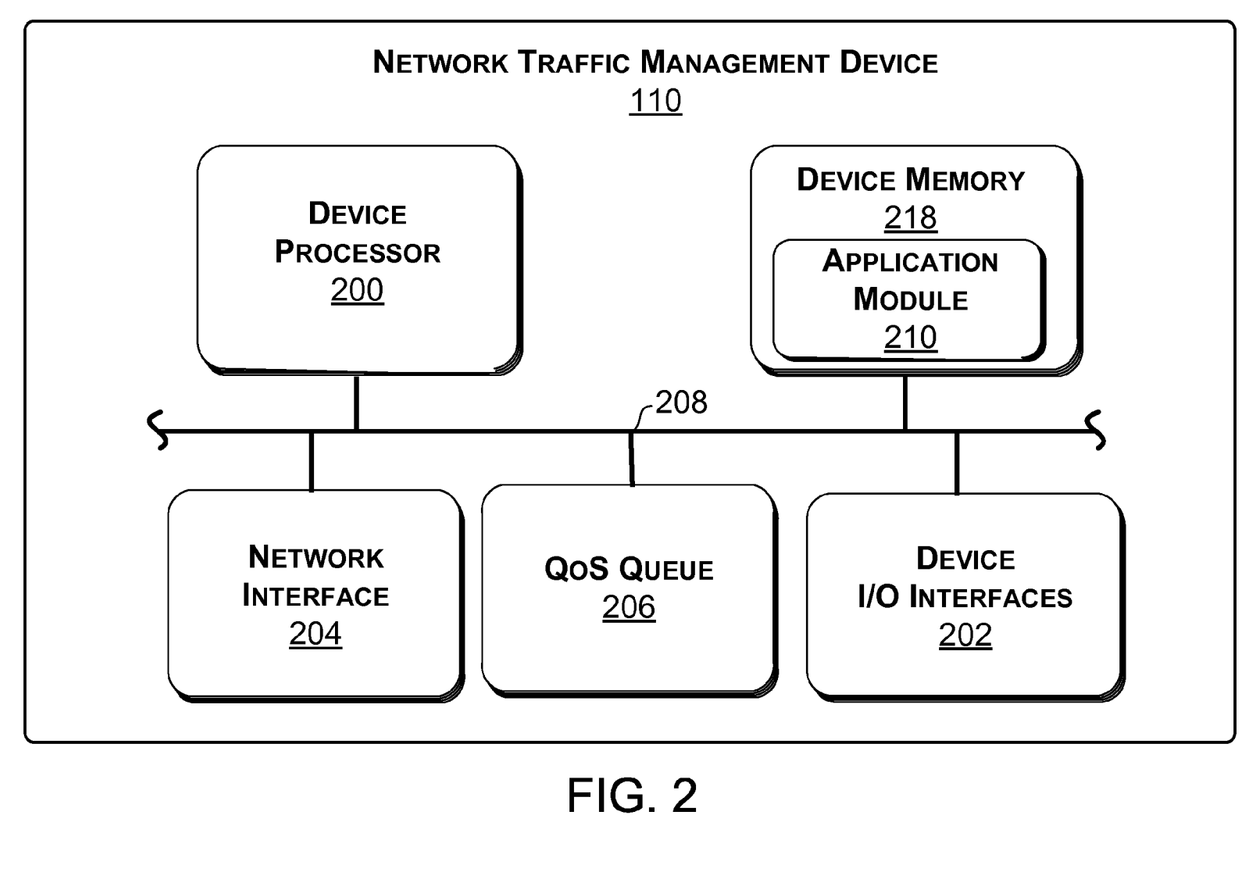
FIG. 2 is a block diagram of a network traffic management device shown in FIG. 1 in accordance with an aspect of the present disclosure.

FIG. 2 is a block diagram of a network device shown in FIG. 1 in accordance with an aspect of the present disclosure. As shown in FIG. 2, the network device may be a client device 106 and/or a network traffic management device 110 which includes one or more local device processors 200, one or more device I/O interfaces 202, one or more network interface 204, and one or more device memories 218 coupled together by bus 208. It should be noted that the network device 106,110 could include other types and numbers of components. In addition, as shown in FIG. 2, the network device 106, 110 includes a software-based application module 210 which is stored in the memory 218, whereby the processor 200 implements the application module 210 to perform the processes with regard to the data packets, as described in the Figures below.

Device processor 200 comprises one or more microprocessors configured to execute computer/machine readable and executable instructions, such as the application module 210, stored in device memory 218. It is understood that the processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like. The processor is programmed or configured according to the teachings as described and illustrated in the present disclosure.

Device I/O interfaces 202 comprise one or more user input and output device interface mechanisms. The interface may include a computer keyboard, touchscreen, mouse, display device, and the corresponding physical ports and underlying supporting hardware and software to enable the network device 106, 110 to communicate with the outside environment. Such communication may include accepting user data input and to provide user output, although other types and numbers of user input and output devices may be used. Additionally or alternatively, as will be described in connection with network interface 204 below, the network device 106, 110 may communicate with the outside environment for certain types of operations (e.g., configuration) via one or more network management ports.

Network interface 204 comprises one or more mechanisms that enable the network device 106, 110 to engage in TCP/IP communications via the LAN 104 and the network 108. However, it is contemplated that the network interface 204 may be constructed for use with other communication protocols and types of networks. In an aspect, the network interface 204, enabled by software, is able to transmit and receive of data packets, data streams, and/or datagrams that are sent over the connection. Network interface 204 is sometimes referred to as a transceiver, transceiving device, or network interface card (NIC), which transmits and receives network data packets to one or more networks, such as LAN 104 and network 108. In an example where the network device 106, 110 includes more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the network device 106, 110 with other network devices, such as servers 102. Moreover, the network interface 204 may include certain physical ports dedicated to receiving and/or transmitting certain types of network data, such as device management related data for configuring the network device 106, 110. In an aspect, the network interface 204 includes a transmit descriptor ring or other similar module which serves as the location where data packets are stored just prior to being transmitted to the receiving network device.

In an aspect, the network traffic management device 110 is configured to execute rate shaping functionality. It should be noted that the rate shaping functions are in conformance with a CoS queue, although other rate shaping configurations are contemplated. Such instructions implement the network traffic management related functions of the network traffic management device 110. In addition, the instructions implement the application module 210 to perform one or more portions of the processes illustrated in FIG. 3. The processor and memory are programmed or configured according to the teachings as described and illustrated herein with respect to FIG. 3.

Bus 208 may comprise one or more internal device component communication buses, links, bridges and supporting components, such as bus controllers and/or arbiters. The bus enable the various components of the network device 106, 110, such as the processor 200, device I/O interfaces 202, network interface 204, and device memory 218, to communicate with one another. However, it is contemplated that the bus may enable one or more components of the client device 106 to communicate with components in other network devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the network device 106, 110.

Device memory 218 comprises non-transitory computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media contains computer readable/machine-executable instructions, data structures, program modules, or other data, which may be obtained and/or executed by one or more processors, such as device processor 200. Such instructions allow the processor to perform actions, including implementing an operating system for controlling the general operation of the network device 106, 110 to perform one or more portions of the process described herein.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information. Such desired information includes data and/or computer/machine-executable instructions and which can be accessed by a computing or specially programmed device, such as network device 106, 110.

Figure 3:
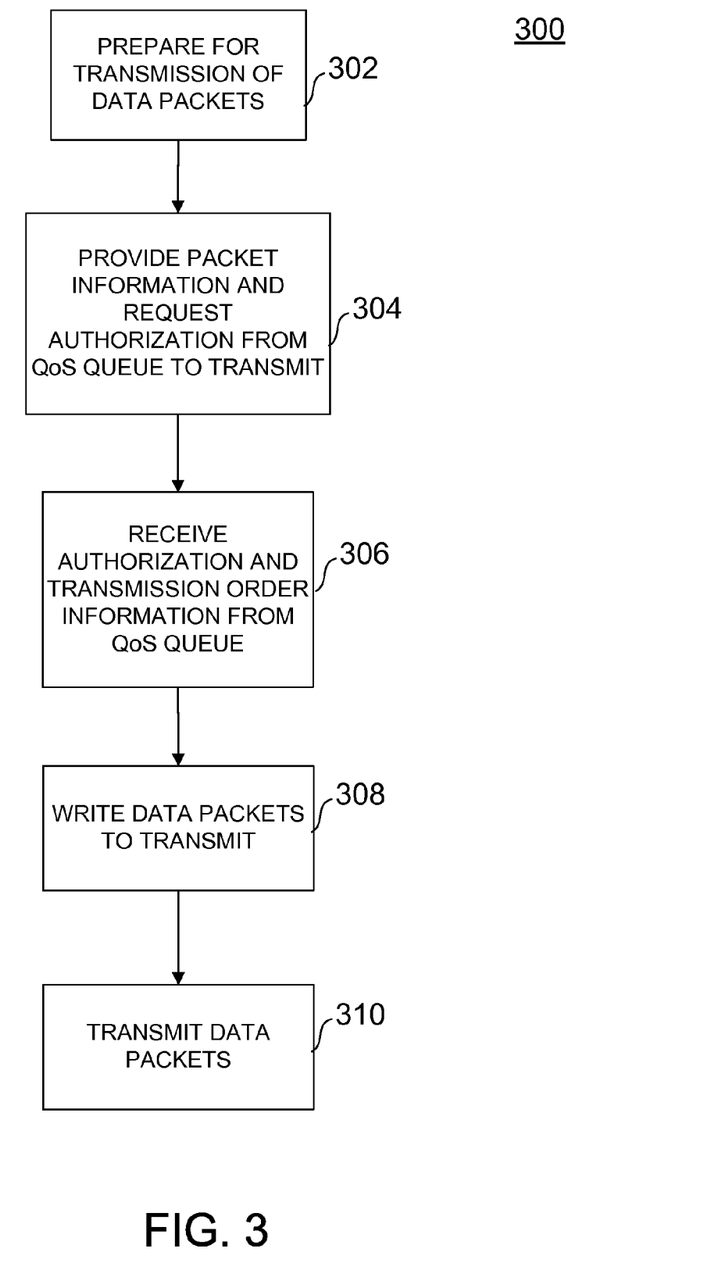
FIG. 3 illustrates a flow chart representing the process of transmitting data packets in accordance with an aspect of the present disclosure.

The software based application module 210 shown in FIG. 2 performs the processes described in relation to FIG. 3. It should be noted that although the application module 210 is shown within the memory 218, it is contemplated that the application module 210 may be elsewhere inside or exterior to the network device 106, 110. The application module 210 contains computer readable instructions which, when executed by one or more processors 200, causes the processor 200 on the network device to perform the processes described in FIG. 3.

For purposes of the present disclosure, a transmitting network device (also referred to as transmitting device) is a network device that transmits one or more data packets to a receiving network device (also referred to as receiving device). In an aspect, the transmitting network device can be the client device 106 and the receiving network device can be the network traffic management device 110 depending on the direction of the data flow. In this example aspect, the client device 106, which executes the application module 210, packetizes one or more data packets in the QoS queue and operates with the QoS to transmit the packetized data packets over the network 108 to the network traffic management device 110.

In another aspect, the transmitting network device can be the network traffic management device 110 and the receiving network device can be the client device 106 depending on the direction of the data flow. In this example aspect, the network traffic management device 110, which executes the application module 210, packetizes one or more data packets in the QoS queue and operates with the QoS to transmit the packetized data packets over the network 108 to the client device 106.

In general, the system, non-transitory machine readable medium and method of the present disclosure utilizes the application module which operates with a QoS queue, whereby the application module is configured to await permission from the QoS queue before packetizing the data packet(s) before transmission. The present disclosure is a significant departure from the existing method of writing or packetizing the data packets and then forwarding the written data packets to the QoS queue for buffering. In particular, the system and method of the present disclosure is configured to allow the QoS queue to account for non-transmitted and unpacketized data stream and provide a place holder for the accounted-for data stream in which the place holder represents the order in which the data stream is to be transmitted.

Once the application module 210 determines that a particular data stream (comprising accounted for data packets) is to be transmitted, that data stream is packetized in accordance with the TCP layer, time-stamped, and transmitted over the network 108 to the receiving network device. Thus, the present system and method delays or shifts the packetization and application of time-sensitive logic of the data packets to occur at the point of transmission instead of when it is sent to the QoS queue to be buffered.

The present system and method has inherent and long-felt advantages by increasing the RTT accuracy on rate-shaped flows. In addition, by receiving a place holder from the QoS queue, or being enqueued, the application module 210 is given the flexibility to determine when data packets in a particular stream are to be packetized based on newly received information.

For example, if additional user data has been received at the transmitting network device after the to-be transmitted data packets have been enqueued, the application module 210 of the transmitting network device can include that additional information into the data packets since they have not been transmitted yet. In another example, if the transmitting network device receives an ACK from the receiving network device after the data packets have been enqueued, but not sent, the transmitting network device would not retransmit those enqueued data packets but instead send other data packets.

In an aspect, when requesting permission from the QoS queue, the application module 210 of the transmitting network device 106, 110 will provide the class of service (CoS), the size of the packets and other relevant information of the data packets which it intends to send to the receiving network device. CoS information may range from voice, video, email, file transfer, transaction processing etc. the type of user (e.g. VIP vs. normal), mission-critical data transactions, video or voice transmissions and the like. Regarding the size of the packet, any changes in the size of the actual packet between being enqueued and being transmitted is provided by the application module 210 to the QoS queue, whereby the QoS queue is able to make appropriate accounting or queuing updates. It is also contemplated that if the priority of the enqueued packet changes, the application module 210 can request a place holder modification from the QoS queue to promote or demote the transmission priority of that data packet.

FIG. 3 illustrates a flow chart representing the process of transmitting data packets in accordance with an aspect of the present disclosure. As shown in FIG. 3, the process 300 begins with the application module 210 of the transmitting network device 106, 110 preparing to send one or more data packets in a data stream to a receiving network device (Block 302). In an aspect, the application module 210 of the transmitting network device 106, 110 requests authorization from the QoS queue to transmit a data packet, whereby the application module 210*o* provides general information of the data packet to the QoS queue (Block 304). Such packet information may include CoS information of the packet, size of the packet and any other appropriate information which allows performance of rate shaping duties. However, the transmitting network device 106, 110 does not provide the CoS queue with the written data packet itself.

The QoS queue thereafter assigns a place holder for that intended packet and provides a transmission order to the application module 210 of the transmitting network device 110 in which the transmission order contains sufficient information to notify the application module 110 when it is to send the data packet (Block 306). In an aspect, the QoS queue may provide an authorization status to the transmitting device's application module 210 which represents that the data packet has been authorized to send and instruct the transmitting network device 106, 110 to transmit that data packet upon receiving a subsequent transmit command from the QoS queue.

Thereafter, when the transmitting network device 106, 110 determines that the particular data packet is to be transmitted for that transmission order, the application module 210 writes the data packet in conjunction with normal TCP based transmitting procedures (Block 308). Following, the application module 210 of the transmitting network device 106, 110 transmits the data packet directly over the network 108 to the receiving network device 106, 110 (Block 310). In an aspect, the application module 210 of the transmitting network device 106, 110 notifies its QoS queue that the data packet has been sent with or without the time sensitive logic, so that the QoS queue can accordingly update its buffer and be informed of the status of the transmitted data packet.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims.

What is claimed is:

1. A method of packetization of data packets, the method comprising:
    requesting authorization from a QoS queue to transmit an intended data packet over a network, where the authorization request is sent from an application module of a transmitting network device;
    receiving from the QoS queue a transmission order to transmit the intended data packet at a future time;
    packetizing the intended data packet in accordance with the transmission order at the future time; and
    transmitting the packetized data packet over a network to a receiving network device.

2. The method of claim 1, wherein the packetized data packet contains time sensitive logic associated with a transmission time.

3. The method of claim 1, wherein the transmitting network device provides queue specific information of the data packet when requesting authorization from the QoS queue.

4. The method of claim 1, wherein the transmitting network device does not provide content of the data packet when requesting authorization from the QoS queue.

5. The method of claim 1, wherein the packetized data packet is different than the intended data packet.

6. The method of claim 1, wherein the transmitting network device decides what data packet to write in accordance at the future time with the transmission order based on one or more policy parameters.

7. The method of claim 1, wherein the QoS queue is configured to implement rate shaping functionality.

8. A non-transitory machine readable medium having stored thereon instructions for packetization of data packets, comprising machine executable code which when executed by at least one machine, causes the machine to:
    request authorization from a QoS queue to transmit an intended data packet over a network, where the authorization request is sent from an application module of a transmitting network device;
    receive from the QoS queue a transmission order to transmit the intended data packet at a future time;
    packetize the intended data packet in accordance with the transmission order at the future time; and
    transmit the packetized data packet over a network to a receiving network device.

9. The machine readable medium of claim 8, wherein the packetized data packet contains time sensitive logic associated with a transmission time.

10. The machine readable medium of claim 8, wherein the transmitting network device provides queue specific information of the data packet when requesting authorization from the QoS queue.

11. The machine readable medium of claim 8, wherein the transmitting network device does not provide content of the data packet when requesting authorization from the QoS queue.

12. The machine readable medium of claim 8, wherein the packetized data packet is different than the intended data packet.

13. The machine readable medium of claim 8, wherein the transmitting network device decides what data packet to write in accordance at the future time with the transmission order based on one or more policy parameters.

14. The machine readable medium of claim 8, wherein the QoS queue is configured to implement rate shaping functionality.

15. A network device comprising:
    a network interface configured to transmit and receive data packets over a network, the network interface including a QoS queue;
    a memory having stored therein instructions to delay packetization of data packets;
    a processor coupled to the network interface and the memory, the processor executing the instructions in the memory which cause the processor to:
        request authorization from the QoS queue to transmit an intended data packet over a network, where the authorization request is sent from an application module of a transmitting network device;
        receive from the QoS queue a transmission order to transmit the intended data packet at a future time;
        packetize the intended data packet in accordance with the transmission order at the future time; and
        transmit the packetized data packet over a network to a receiving network device.

16. The network device of claim 15, wherein the packetized data packet contains time sensitive logic associated with a transmission time.

17. The network device of claim 15, wherein the transmitting network device provides queue specific information of the data packet when requesting authorization from the QoS queue.

18. The network device of claim 15, wherein the transmitting network device does not provide content of the data packet when requesting authorization from the QoS queue.

19. The network device of claim 15, wherein the packetized data packet is different than the intended data packet.

20. The network device of claim 15, wherein the transmitting network device decides what data packet to write in accordance at the future time with the transmission order based on one or more policy parameters.

21. The network device of claim 15, wherein the QoS queue is configured to implement rate shaping functionality.

* * * * *